United States Patent [19]
Motose et al.

[11] Patent Number: 6,148,777
[45] Date of Patent: Nov. 21, 2000

[54] CONTROL FOR DIRECT INJECTED TWO CYCLE ENGINE

[75] Inventors: Hitoshi Motose; Masahiko Kato, both of Hamamatsu, Japan

[73] Assignee: Sanshin Kogyo Kabushiki Kaisha, Hamamatsu, Japan

[21] Appl. No.: 09/199,731

[22] Filed: Nov. 25, 1998

[30] Foreign Application Priority Data

Nov. 25, 1997 [JP] Japan .................................. 9-338230

[51] Int. Cl.[7] ............................ F02B 33/04; F02B 77/00
[52] U.S. Cl. ................................ 123/73 C; 123/198 D; 123/406.13
[58] Field of Search ............................. 123/73 C, 73 PP, 123/73 SP, 65 A, 198 D, 406.16, 406.13, 294, 479

[56] References Cited

U.S. PATENT DOCUMENTS

| | | | |
|---|---|---|---|
| 5,060,608 | 10/1991 | Umemoto | 123/198 D |
| 5,062,401 | 11/1991 | Suganuma | 123/333 |
| 5,094,192 | 3/1992 | Seiffert et al. | 123/41.15 |
| 5,144,928 | 9/1992 | Komurasaki | 123/425 |
| 5,181,493 | 1/1993 | Motoyama et al. | 123/431 |
| 5,183,013 | 2/1993 | Ito et al. | 123/48 R |
| 5,445,121 | 8/1995 | Kai | 123/198 DC |
| 5,577,487 | 11/1996 | Ohtake et al. | 123/679 |
| 5,579,736 | 12/1996 | Nakamura et al. | 123/339.11 |
| 5,586,524 | 12/1996 | Nonaka et al. | 123/73 A |
| 5,605,136 | 2/1997 | Nakashima | 123/480 |
| 5,615,645 | 4/1997 | Kanno | 123/73 C |
| 5,687,694 | 11/1997 | Kanno | 123/479 |
| 5,827,150 | 10/1998 | Mukumoto | 477/101 |
| 5,937,825 | 8/1999 | Motose | 123/406.13 |

Primary Examiner—Tony M. Argenbright
Assistant Examiner—Hai Huynh
Attorney, Agent, or Firm—Knobbe, Martens, Olson & Bear LLP

[57] ABSTRACT

A fuel injection control strategy and system for engines for maintaining good performance under normal running conditions and also for providing cylinder engine speed slow-down under abnormal conditions without necessitating cylinder skipping except in extreme cases. This control is obtained primarily by retarding injection timing and/or reducing injection duration. Adjustment in spark timing may also be incorporated along with this routine.

20 Claims, 11 Drawing Sheets

CONTROL FOR DIRECT INJECTED TWO CYCLE ENGINE

BACKGROUND OF THE INVENTION

This invention relates to a two cycle engine and more particularly to a direct cylinder injection method and control strategy for such engine.

It is well known that the simplicity of two cycle engines and their ability to produce greater power output for a given displacement than four cycle engines presents a number of advantages, particularly in certain types of applications. However, the exhaust emission control situation with two cycle engines has placed pressure on many manufacturers to convert to four cycle engines for applications normally enjoyed by two cycle engines.

One area where two cycle engines are widely used is in conjunction with outboard motors. With an outboard motor, the engine is, however, required to run over a wide variety of speed and load ranges. For example, it is not untypical for an outboard motor to be operated either at full throttle, full power or in a trolling condition. In this latter condition, the engine actually runs at lower than idle speed. This is a particularly difficult area for two cycle engines to operate in efficiently, particularly when they are designed to produce high power outputs at full throttle.

In order to maintain the desired idle speed and fuel economy, it has been the practice to operate two cycle engines under some conditions with a so-called cylinder skipping method. This methodology is particularly employed when there is some difficulty with the engine or other malfunction that requires the operator to be able to be able to reach port safely, but still protect the engine from damage.

In this limp hold mode, cylinder disabling is frequently employed. This is done by skipping the firing of the cylinders for one or more revolutions. The number of cylinders skipped also varies depending upon the engine speed control that is desired.

The conditions when cylinder skipping is employed may be when shifting the transmission, when there is a danger of decrease in oil availability or when the engine is operating at a high temperature or high speed.

When the cylinder skipping is employed, fuel continues to be supplied to the engine. This is done because of the difficulty in transitioning the operation from skipping mode back to full cylinder operation mode. This is particularly necessary where the charge is delivered to the engine through the crankcase chamber and scavenge arrangement. It takes some time for the fuel charge to reach the combustion chamber and thus it may be necessary to supply fuel even when the cylinder is not being operated. This obviously adds to the emission problems.

There has been proposed, therefore, a system for direct cylinder injection in two cycle engines. However, the injection timing employed with conventional direct injected two cycle engines also can present some emission and smooth running problems. Therefore, a system has been proposed by us that is described in the co-pending application entitled, "Control for Direct Injected Two Cycle Engine", Ser. No. 09/188,953, Filed Nov. 10, 1998 and assigned to the Assignee hereof, where the injection initiation and duration is controlled so as to minimize the likelihood of fuel escaping from the exhaust port while still obtaining maximum power output. In accordance with that arrangement, the initial fuel injection is begun at a point when the exhaust port is still open but at a time wherein the fuel injected will not reach the exhaust port during the time when the exhaust port is still open. Basically, injection is done while the exhaust port is open rather than delaying it until after it closes as with more conventional methodologies.

It is an object of this invention to take advantage of that methodology and to also enable the engine to operate with speed control that does not necessarily require cylinder skipping, but which will reduce the likelihood of the exhaust gases containing unburned hydrocarbons.

It is a further object of this invention to provide a direct cylinder injected two cycle engine having a control arrangement wherein engine speed reduction is obtained without necessitating, under most instances, cylinder skipping to improve transition back to normal running and also to avoid the discharge of hydrocarbons to the atmosphere.

It is a further object of this invention to provide an improved method and construction for providing reduced engine speeds in direct injection two cycle engines under some running conditions without adversely affecting engine emission control or transitioning back to normal running.

SUMMARY OF THE INVENTION

This invention is adapted to be embodied in a two cycle crankcase compression, direct cylinder injected internal combustion engine. The engine is comprised of an engine body defining at least one cylinder bore in which a piston reciprocates. A cylinder head is affixed to one end of the engine body for closing the cylinder bore and defining with the piston and the cylinder bore a combustion chamber. A crankcase chamber is formed at the other end of the cylinder bore. At least one scavenge port interconnects the crankcase chamber with the combustion chamber and is opened and closed by the reciprocation of the piston in the cylinder bore for admitting an air charge to the combustion chamber. At least one exhaust port is formed in the cylinder bore for discharging burned combustion products from the combustion chamber. The exhaust port, like the scavenge port, is opened and closed by the reciprocation of the piston in the cylinder bore. A fuel injector is positioned in the engine body and sprays fuel directly into the combustion chamber for combustion therein.

In accordance with a method for practicing the invention, the fuel is normally injected at a time so as to complete injection before the exhaust port is closed. However, under some running conditions in order to reduce engine speed, injection timing is retarded and/or injection duration is shortened.

In an engine control system embodying the invention, the fuel injection timing and duration is controlled under normal engine running so as to be completed before the exhaust port closes. However, under some running conditions in order to reduce engine speed, the injection timing is retarded and/or the duration is decreased.

DETAILED DESCRIPTION OF THE PREFERRED EMBODIMENTS OF THE INVENTION

Figure 1:
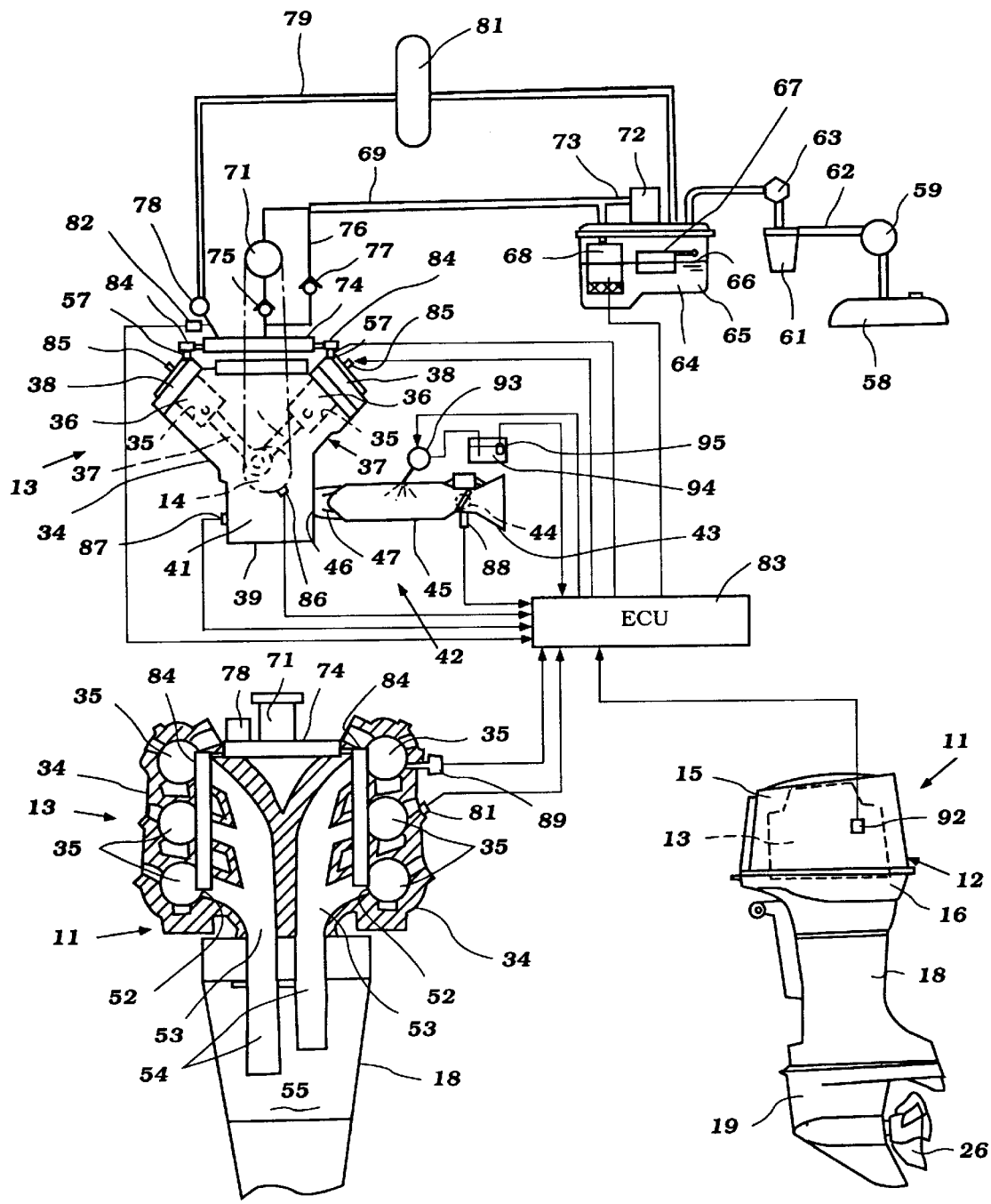
FIG. 1 is a partially schematic view having three portions that are connected by the controlling ECU of the engine. The lower right hand portion of this view shows a partial side elevational view of an outboard motor, the lower left hand side shows a rear elevational view of the outboard motor on an enlarged scale and a partial cross-section of the engine taken through the cylinders and exhaust manifold and the upper portion shows a top plan view of the engine and the fuel supply system with portions shown schematically.
Figure 2:
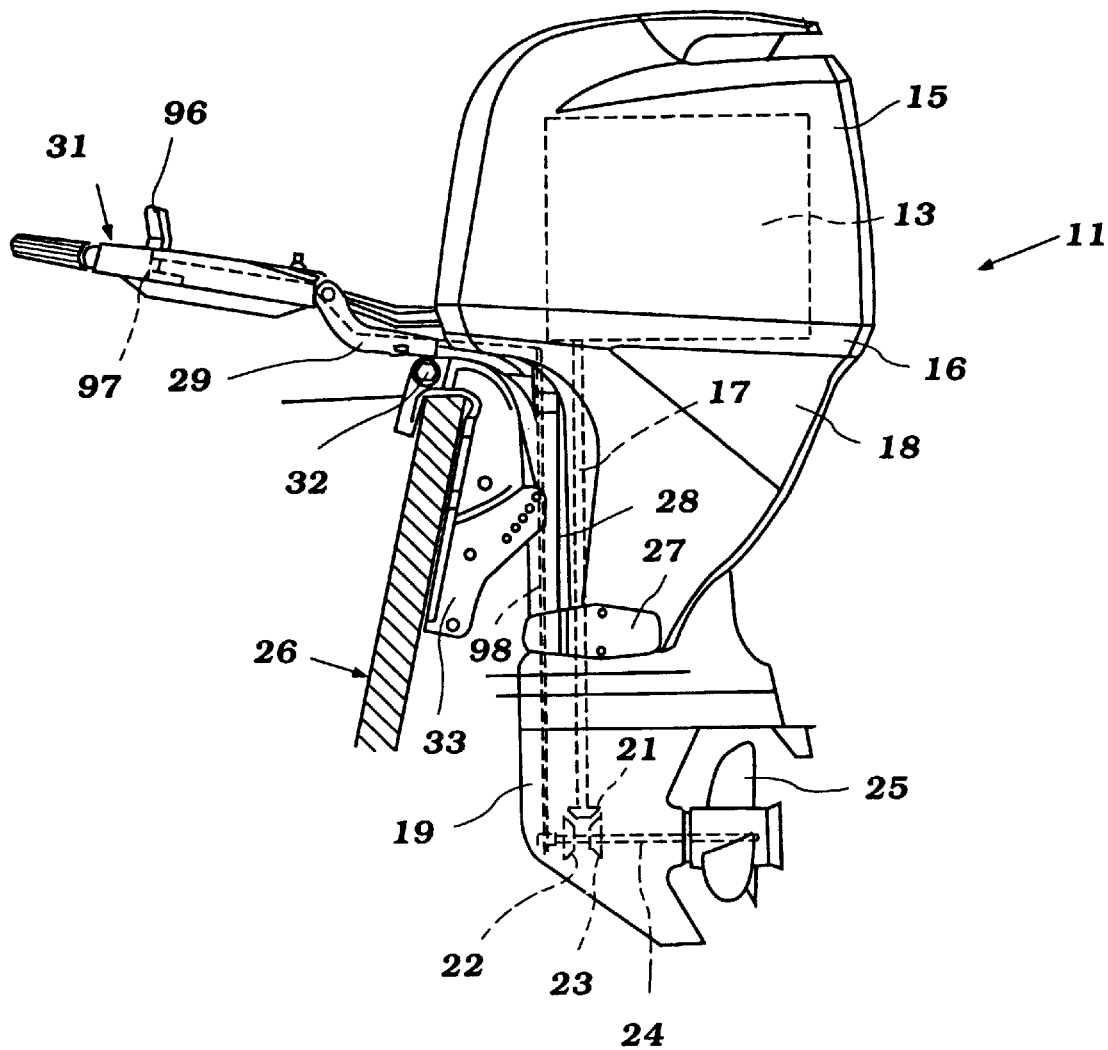
FIG. 2 is an enlarged and complete side elevational view of the outboard motor looking in the same direction as the lower right hand portion of FIG. 1, showing the motor attached to the transom of a watercraft.

Referring initially primarily to FIGS. 1 and 2, the lower left hand portion of FIG. 1 and FIG. 2 illustrate a side elevational of an outboard motor that is constructed and operated in accordance with the invention. The outboard motor is indicated generally by the reference numeral 11 and except as will hereinafter be noted maybe considered to be of a generally conventional construction.

The outboard motor 11 is comprised of a power head 12 that contains a powering internal combustion engine 13. As best seen in the other two portions of this FIG. 1, the engine 13 is, in the illustrated embodiment, of the V6 type and operates on a two stroke, crankcase compression principal. Although the number of cylinders and cylinder orientation can be varied, the invention has particularly utility in connection with two cycle engines and particularly those having multiple cylinders.

As is typical with outboard motor practice, the engine 13 is supported in the power head 12 so that its crankshaft 14 rotates about a vertically extending axis for a reason which will be described momentarily.

The power head 12 is completed by a protective cowling consisting of a main cowling member 15 which surrounds and protects the engine 13. The main cowling member 15 is detacheably connected to a tray 16 in any manner known in the art. This main cowling member 15 is formed with an air inlet opening so that induction air for operation for the engine 13 can be drawn from the surrounding atmosphere.

Figure 3:
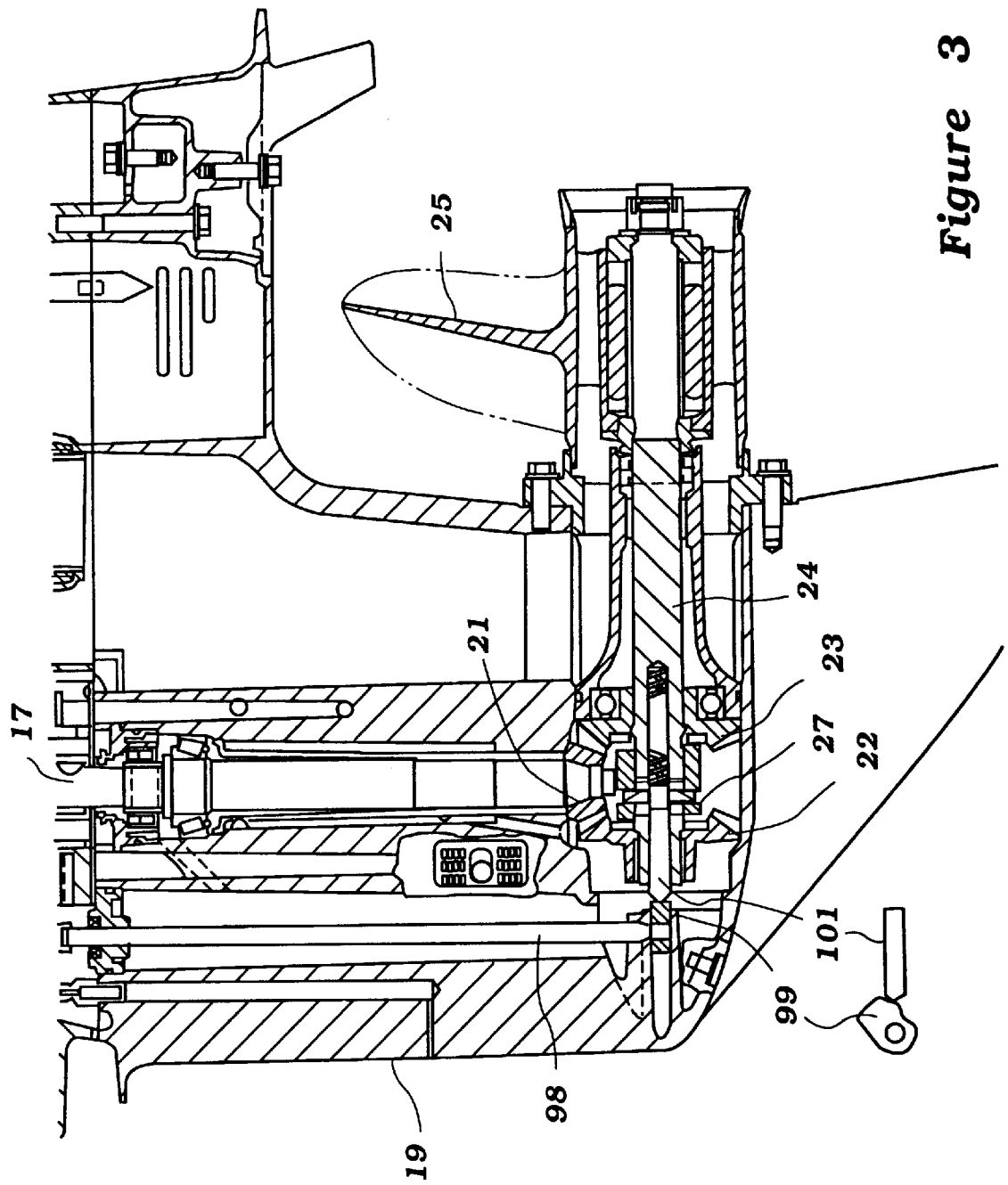
FIG. 3 is a partial cross sectional view of the lower unit of the outboard motor, looking in the same direction as FIG. 2.

The engine 13 and specifically its crankshaft 14 is coupled to a driveshaft 17 that depends into and is journaled within a driveshaft housing, lower unit assembly 18. The drive shaft 17 depends into a lower unit assembly 19 as best shown in FIG. 3. A driving bevel gear 21 is affixed to the lower end of the drive shaft 17 and is enmeshed with a pair of diametrically opposed, oppositely rotating driven bevel gears 22 and 23 of a reversing type transmission frequently used in outboard motor propulsion systems.

The driven bevel gears 22 and 23 are journaled for rotation on a propeller shaft 24 to which a propeller 25 is affixed for propelling the associated watercraft, shown partially in FIG. 2 and identified generally by the reference numeral 26. A dog clutching element 27 has a splined connection to the propeller shaft 26 and is adapted to be shifted into driving engagement with cooperating clutching teeth on a selected one of the driven bevel gears 22 and 23 for driving the propeller 25 in selected forward or reverse direction. The mechanism by which this transmission is controlled will be described later.

A steering shaft (not shown) is affixed to the drive shaft housing and lower unit assembly 18 by means that include a lower support bracket 27. This steering shaft is journaled for steering motion about a vertically extending axis within a swivel bracket 28. A tiller 29 is affixed to the upper end of the steering shaft so that the outboard motor 11 may be steered in a manner well known in this art.

A control handle assembly 31 is mounted at the forward end of the tiller 29 and contains certain controls for the outboard motor, as will be described later.

The swivel bracket 28 is pivotally connected by means of a pivot pin 32 to a clamping bracket 33. The clamping bracket 33 is, in turn, affixed to the transom of the watercraft hull 26 in a manner well known in this art.

Referring now primarily to the lower left hand view and the upper view of FIG. 1, the engine 13 includes a cylinder block, indicated generally by the reference numeral 34. Because of the V-type configuration employed in the illustrated embodiment, the cylinder block 34 is formed with two cylinder banks each of which has three vertically spaced cylinder bores 35. Pistons 36 are slidably supported in the cylinder bores 35. The pistons 36 are connected by means of connecting rods 37 to the throws of the crankshaft 14 for driving it in a known manner.

Cylinder head assemblies, indicated generally by the reference numeral 38 are affixed to the banks of the cylinder block 34 and close the cylinder bores 36. These cylinder head assemblies 38, the cylinder bores 35 and the pistons 36 form the combustion chambers of the engine 13.

The crankshaft 14 rotates in a crankcase chamber defined by the cylinder block 34 and a crankcase member 39 that is affixed thereto. As is typical with two cycle crankcase compression engines, the portions of the crankcase chamber, indicated schematically at 41, associated with each of the cylinder bores 35 are sealed from each other.

An air charge is delivered to these individual crankcase chamber sections 41 by an air induction system which appears also in the upper portion of FIG. 1 and which is indicated generally by the reference numeral 42. This induction system 42 includes an air inlet device 43 that may include a silencing arrangement and which draws air from within the main cowling member 15 that has been admitted through the aforenoted inlet opening.

A throttle valve 44 is provided in throttle bodies that communicate with the intake device 43 and deliver it to intake manifold runners 45 of an intake manifold assembly. The throttle valves 44 are controlled in any suitable manner to satisfy the operator demand. The intake manifold runners 45 communicate with intake ports 46 formed in the crankcase member 39 and each associated with a respective cylinder bore 35.

Reed type check valves 47 are provided in the manifold runners 45 adjacent the intake ports 46. These reed type check valves permit an air charge to be drawn into the crankcase chambers when the respective pistons 36 are moving upwardly in their cylinder bores 35. As the pistons 36 move downwardly, the charge in the crankcase chambers 41 will be compressed and the respective reed type check valve 47 will close to preclude reverse flow.

Figure 4:
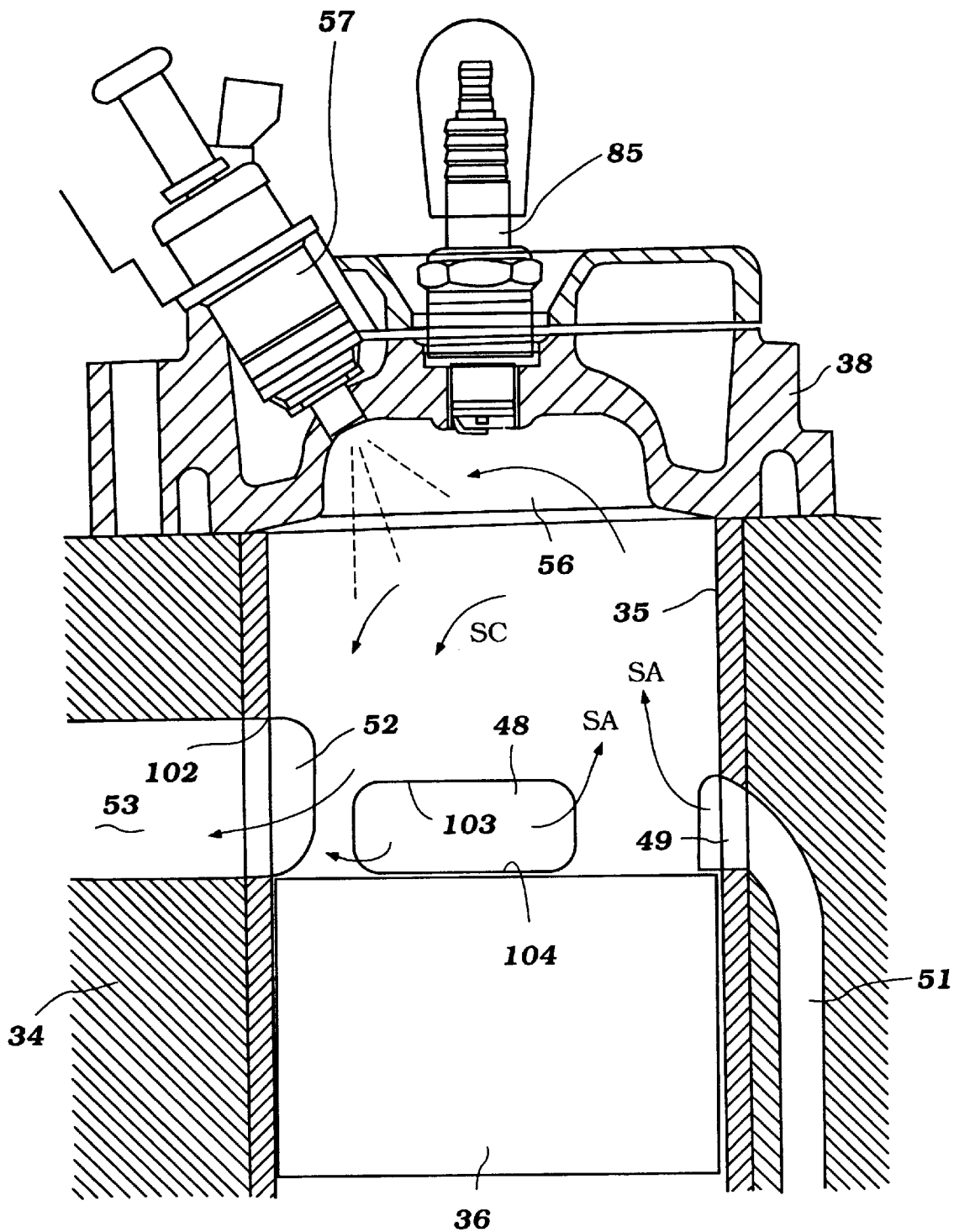
FIG. 4 is an enlarged cross-sectional view taken through a single cylinder of the engine and depicts part of the theory by which the control strategy operates.
Figure 5:
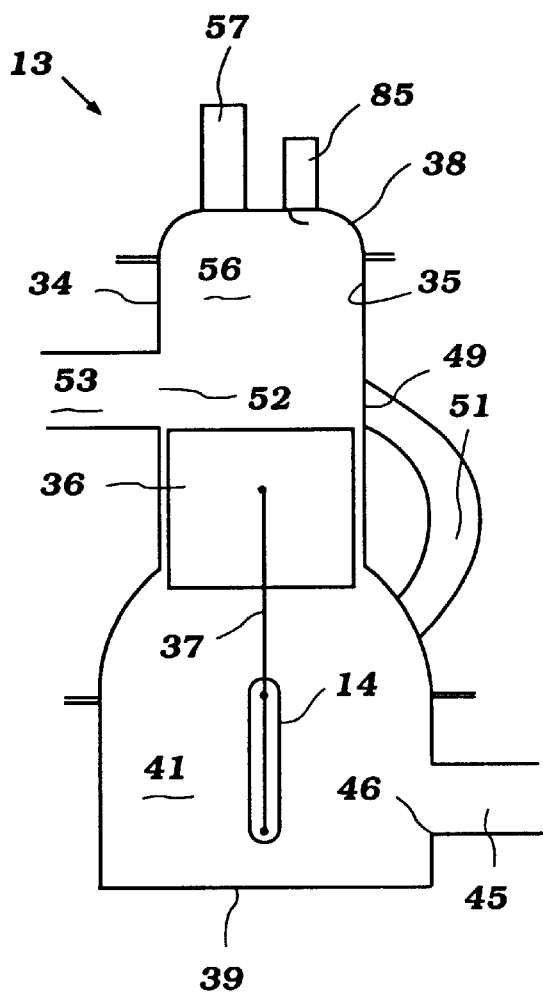
FIG. 5 is a partially schematic view taken generally in the same direction as the upper portion of FIG. 1 but only of a single cylinder and shows the piston at its bottom dead center position.
Figure 6:
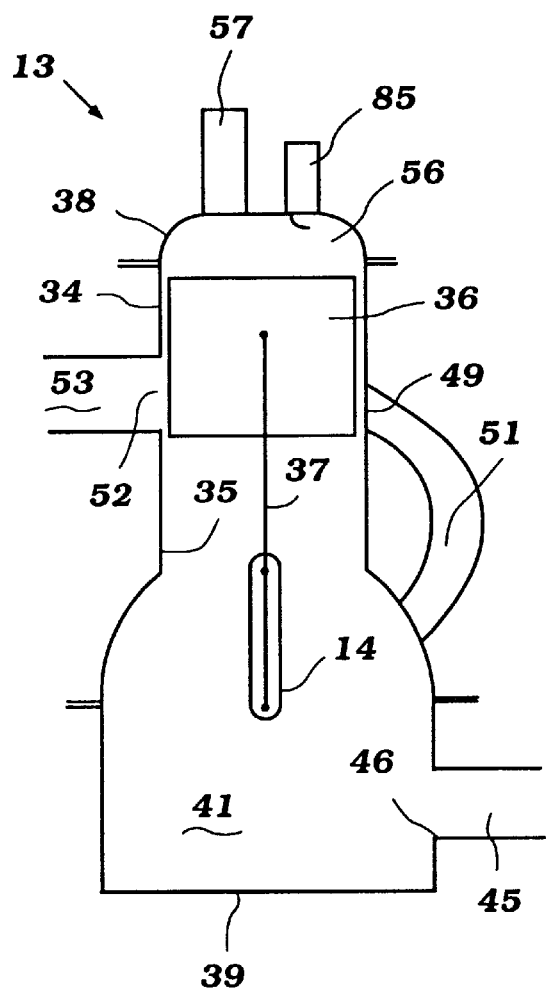
FIG. 6 is a view, in part similar to FIG. 5 and shows the piston at its top dead center position.

Referring now additionally to FIGS. 4–6, it will be seen that each cylinder bore 35 is provided with a scavenging system. In the illustrated embodiment, the scavenging system is of the Schnurl type and includes a pair of side, main scavenge ports 48 and a center, auxiliary scavenge port 49. Scavenge passages 51 communicate the crankcase chambers 41 with each of the scavenge ports 48 and 49. As is well known in two cycle practice, the scavenge ports 48 and 49 are opened and closed by the reciprocation of the pistons 36 in the cylinder bores 35.

It should be noted that the main scavenge ports 48 are disposed on opposite sides of an exhaust port 52 which is diametrically opposite the auxiliary scavenge port 49. As may be best seen in the lower left hand portion of FIG. 1, the exhaust ports 52 communicate with exhaust manifolds 53 that are formed integrally within the cylinder block 34. Basically, there is an exhaust manifold 53 for each bank of cylinders.

These exhaust manifolds 53 terminate in exhaust pipes 54 that depend into an expansion chamber 55 formed in the driveshaft housing and lower unit 18. This expansion chamber 55 communicates with a suitable high speed underwater exhaust gas discharge and a low speed above-the-water exhaust gas discharge of any known type. The particular type of exhaust system employed does not form any part of the invention although the invention does have utility in connection with engines having multiple cylinders and arrangements wherein a plurality of exhaust ports of those cylinders communicate with a common exhaust manifold.

As the pistons 36 move downwardly in their cylinder bores 35 toward the bottom dead center position shown in FIG. 4, the charge compressed in the crankcase chambers 41 will be compressed and eventually transfer to the respective engine combustion chamber, indicated generally by the reference numeral 56 through the scavenge passages 51 and scavenge ports 48 and 49 when they are opened by the movement of the piston 36. The flow of scavenging air is shown in FIG. 4 by the arrows Sa.

In accordance with an important feature of the invention, the engine 13 is provided with a direct cylinder fuel injection system. This fuel injection system is shown in parts schematically in the upper portion of FIG. 1 and will now be described by particular reference to that figure. Before referring thereto, however, it should be noted that fuel injectors 57 are mounted in the cylinder head assembly 38 so as to spray fuel from this fuel supply system directly into the combustion chambers 56. The location and functioning of these fuel injectors 57 will be described after the system which supplies fuel to them has been described.

As is typical with outboard motor practice, the outboard motor 11 is supplied with fuel from a main fuel tank 58 which is normally mounted within the hull of the associated watercraft. Fuel is supplied form this tank 58 by a first low pressure pump 59 to a fuel filter 61 that is mounted within the main cowling member 13. The connection from the fuel tank 58 to the filter 61 includes a conduit 62 having a quick disconnect coupling of a known type.

Second, engine driven low pressure fuel pumps 63 in the power head 12 collect the fuel from the fuel filter 61 and delivers it to a vapor separator, indicated generally by the reference numeral 64. The low pressure fuel pumps 63 may be of the type that are operated by crankcase pressure variations as is well known in this art.

The vapor separator 64 includes an outer housing 65 that is mounted at a suitable location within the protective cowling 15. A level of fuel, indicated at 66 is maintained in this housing 65 by a valve operated by a float 67.

Contained within the housing 65 is an electrically driven pressure pump 68 which develops a higher pressure than the pumps 63 but a pressure that is not really high enough for effective high pressure direct cylinder injection.

This fuel is discharged from the vapor separator housing 65 through a supply conduit 69 to a high pressure, engine driven, positive displacement pump 71. The pump 71 may be of any known type and preferably has one or more plungers operated by cams for delivering extremely high pressures at a positive displacement. The pressure at which fuel is delivered to the high pressure pump 71 is regulated by a low pressure regulator 72 in a return line 73 that communicates the pressure line 69 back with the interior of the vapor separator body 65.

The high pressure pump 71 delivers fuel under pressure to a main fuel manifold 74 through a conduit in which a check valve 75 is positioned. A parallel conduit 76 extends around the high pressure pump 71 to the main fuel manifold. A check valve 77 is provided in this bypass line so that when the high pressure pump 71 is generating high pressure fluid, no flow will occur through the line 76.

A high pressure regulator 78 is provided in the main fuel manifold 74 and limits the maximum pressure of the fuel supply to the fuel injectors 43. This is done by dumping fuel back to the vapor separator assembly 64 through a return line 79. A fuel heat exchanger or cooler 81 may be provided in this return line 79 so as to ensure that the fuel is not at too high a temperature.

A pressure sensing device 82 is provided also in the main fuel manifold 74 for providing a fuel pressure signal to an ECU, indicated at 83 in FIG. 1 for controlling the engine systems, as will be described.

The main fuel manifold 74 supplies fuel to a pair of fuel rails 84 each of which is associated with a respective one of the cylinder banks. The fuel rails 84 each supply fuel in a known manner to the fuel injectors 57 of the respective cylinder banks.

As seen in FIG. 4, the fuel injectors 43 are mounted in the cylinder head assemblies 38, in the illustrated embodiment, over the exhaust ports 52 on the exhaust side of the engine. These injectors spray downwardly toward the heads of the pistons 36. The fuel injectors 57 are preferably of the solenoid operated type and have a solenoid valve which, when opened, controls the discharge of fuel into the combustion chambers as shown in broken lines in FIG. 4 so as to provide a fuel patch in the combustion chamber 56, the size of which depends upon the duration of fuel injection as will become apparent.

Spark plugs 85 are mounted in the cylinder head assemblies 38 and have their spark gaps disposed substantially on the axis of the cylinder bores 35. These spark plugs 85 are fired by an ignition circuit under the control of the ECU 83.

The ECU 83 controls the timing of firing of the spark plugs 85 and the beginning and duration of fuel injection by the injectors 57. To this end, there is provided a number of sensors which sense either engine running conditions, ambient conditions or conditions of the outboard motor 11 that will effect engine performance. Certain of the sensors are shown schematically in FIG. 1 and will be described by reference to that figure. It should be readily apparent to those skilled in the art, however, that other types of sensing and control arrangements may be provided operating within the general parameters which will be set forth later having to do with the timing of initiation of fuel injection.

A crank angle sensor 86 is associated with the crankshaft 14. This sensor 86 provides not only a signal of crank angle but by comparing that signal with time an indication of crankshaft rotational speed.

There is also provided a crankcase pressure sensor 87 which senses the pressure in one or all of the crankcase chambers 41. By measuring crankcase pressure at a particular crank angle, engine air induction amount can be determined.

Engine or operator demand is determined by a throttle position sensor 88 that operates in conjunction with a throttle valve 44 so as to determine this function.

The ECU 83 may operate on a feedback control condition and thus, an air fuel ratio sensor 89 is provided that communicates with the combustion chambers or exhaust port of at least one of the cylinder. Preferably, an oxygen sensor is utilized for this purpose, although other types of devices may be employed.

Engine temperature is sensed by a engine temperature sensor 91.

The temperature of the cooling water drawn from the body of water in which the watercraft or outboard motor 11 is operated is measured by a water temperature sensor 92. As has been noted, those sensors described may be just typical of any of the wide variety of sensors utilized for engine control.

In addition to controlling timing of firing of the spark plugs 85 and initiation and duration of fuel injection by the fuel injectors 57, the ECU 83 may also control a lubricating system. This is comprised of an oil supply system including a pump 93 that sprays oil into the intake passages 45 for engine lubrication. This oil is drawn from a reservoir 94. A sensor 95 senses the oil level in the reservoir 94. In addition, some forms of direct lubrication may be also employed for delivering lubricant directly to certain components of the engine.

It has been noted that the transmission, shown in most detail in FIGS. 2 and 3 comprising the bevel gears 22 and 23 and the dog clutch 27 is operated by a suitable control. This operational control will be now described by reference to those figures.

The control handle 31 attached to the tiller 29 is provided with a shift lever 96 that operates a wire actuator 97 to, in turn, effect rotation of a shift rod 98 that is journaled within the drive shaft housing 18 and which depends into the lower unit 19. This shift rod 98 has a cam 99 affixed to it and which cooperates with a shift plunger 101 so as to effect reciprocation of the dog clutching element 27 into engagement with the selected driven bevel gear 22 or 23 in a manner known in this art The system as thus far described may be considered to be conventional, except for the injection control strategy described in our aforenoted co-pending application, and for that reason, where any component has not been illustrated or described in detail, reference may be had to conventional or known structures with which to practice the invention. The system also includes a normal running injection and ignition control system as described in our aforenoted co-pending application. This basic, normal engine control may be understood by first referring to the timing diagram shown in FIG. 7.

Figure 7:
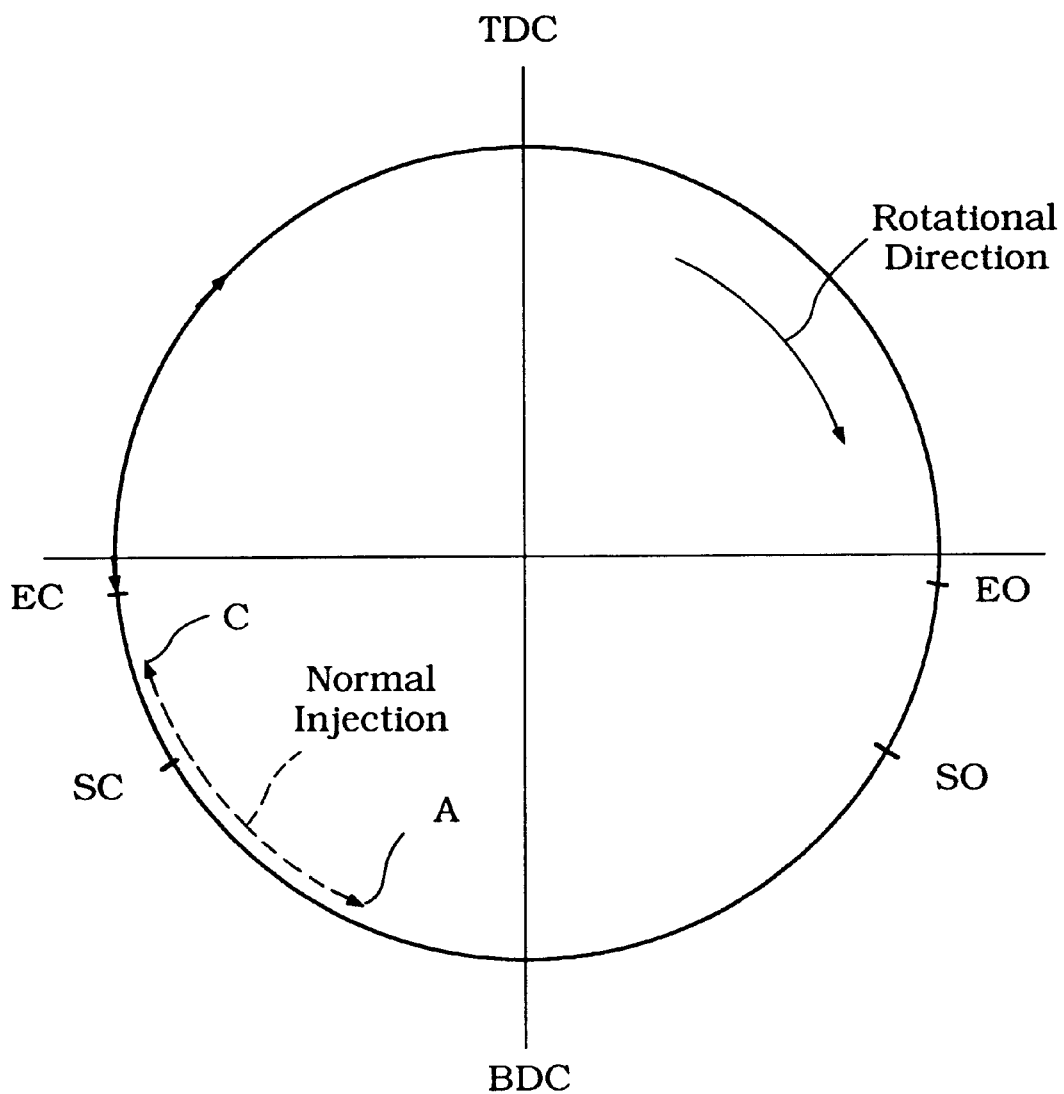
FIG. 7 is a timing diagram showing the fuel injection strategy in relation to crank angle in accordance with the invention.

The direction of crankshaft rotation is indicated by the arrow R and the piston top dead center position, as shown in FIG. 6, is indicated at TDC in FIG. 7. Bottom dead center position (FIG. 5) is indicated in FIG. 7 as BDC. This figure also shows the timing of opening of the scavenge and exhaust ports and their respective closing. The opening of the exhaust ports 52 occurs when the piston passes the upper edge 102 (FIG. 2) of the exhaust port 52. This point is indicated as EO in FIG. 6.

As the pistons 36 continue their downward movement eventually the scavenge ports will open when their upper edges 103 are opened by the downward movement of the pistons 36. This point appears in FIG. 7 as SO.

The scavenging operation continues when the piston 36 passes bottom dead center and begins to move upwardly to begin to close the scavenge ports 48 and 49 by passing their lower edges 104. Full closure of the scavenge ports occurs at the point SC in FIG. 7 when the piston again passes the upper edge 103 of the scavenge ports 48 and 49. Finally, the exhaust ports 52 are closed when the pistons 36 pass their upper edges 102 at the point EC.

With conventional engine injection strategies, the fuel injection is begun generally almost immediately after the exhaust ports 52 are closed with the duration being determined by the load on the engine. The scavenge air flow acts so as to take the fuel patch and drive it toward the exhaust port 52. Thus, the conventional practice is to cause the injection to happen late in the cycle before the piston reaches top dead center and immediately before firing. As more fuel is required, the injection duration is extended. However, this may cause the fuel to travel to the exhaust port before combustion has been completed and when the exhaust port again opens some unburned fuel may escape.

Also the velocity of air flow in the combustion chamber at this time is relatively low and there will be poor mixing of fuel with the air. The low air velocity also results in poor flame propagation and poor and/or incomplete combustion results.

In accordance with the invention as described in our aforenoted co-pending application, the injection timing is initiated before a point where the injected fuel path toward the exhaust port 52 and specifically its upper edge 102 (Distance L) will not reach the exhaust port before it has fully closed. This time is referred as the "fuel reachable time or angle of crank rotation". This fuel reachable time Tf in seconds is the time period for arrival of the fuel to the exhaust port and is determined by dividing the distance L by the speed of fuel as injected Vf.

$$Tf=L/Vf$$

Assuming the engine speed is in rpm, the fuel reachable angle, Kf, which the crankshaft rotates within the fuel reachable time, Tf, is obtained by multiplying Tf by engine speed, n, by 360° and divided by 60.

$$Kf=(Tf \times n \times 360)/60$$

As a specific example, if the engine is running in a condition wherein the fuel reachable angle Kf will be 60° if the fuel reachable timing is 2.5 milliseconds and the engine speed is 4000 rpm.

Thus, in accordance with that invention, the fuel injection is initiated at a time A after bottom dead center and before exhaust port closing and continuing to the point C which is a point again before the exhaust port closes. Thus, to further ensure that fuel will not pass out of the exhaust port before it closes, the beginning of fuel injection at the point A or the actual fuel reachable angle Kf is compensated by an amount α which is in the direction opposite to the direction of crankshaft rotation. In other words, the time of beginning of injection is advanced.

By doing this, it is possible to obtain better mixing of the fuel and air thus making a substantial reduced reduction in the amount of hydrocarbon emissions by improving combustion and combustion efficiency. Also, by advancing the timing of injection start from that conventionally employed, the airflow velocity within the cylinder is higher therefore, fuel mixing is further improved.

This type of normal injection control is employed under all running conditions except under conditions where it may be desirable to slow the engine to protect against damage under certain malfunctions while still maintaining a limp home mode. This routine is designed so as to reduce the necessity of cylinder skipping, only under extreme conditions, and to avoid the problems attendant therewith.

By utilizing this modified method of engine speed slowing, engine emissions can be reduced and transitional performance increased. This is particularly made possible due to the incorporation of the aforenoted injection control strategy for normal running, and the fact that there is direct cylinder injection.

Basically, the concept is to reduce engine speed under certain conditions, as will be hereinafter described, by retarding the initial timing of fuel injection and/or by substantially decreasing the injection duration from that required under normal engine running.

Figure 8:
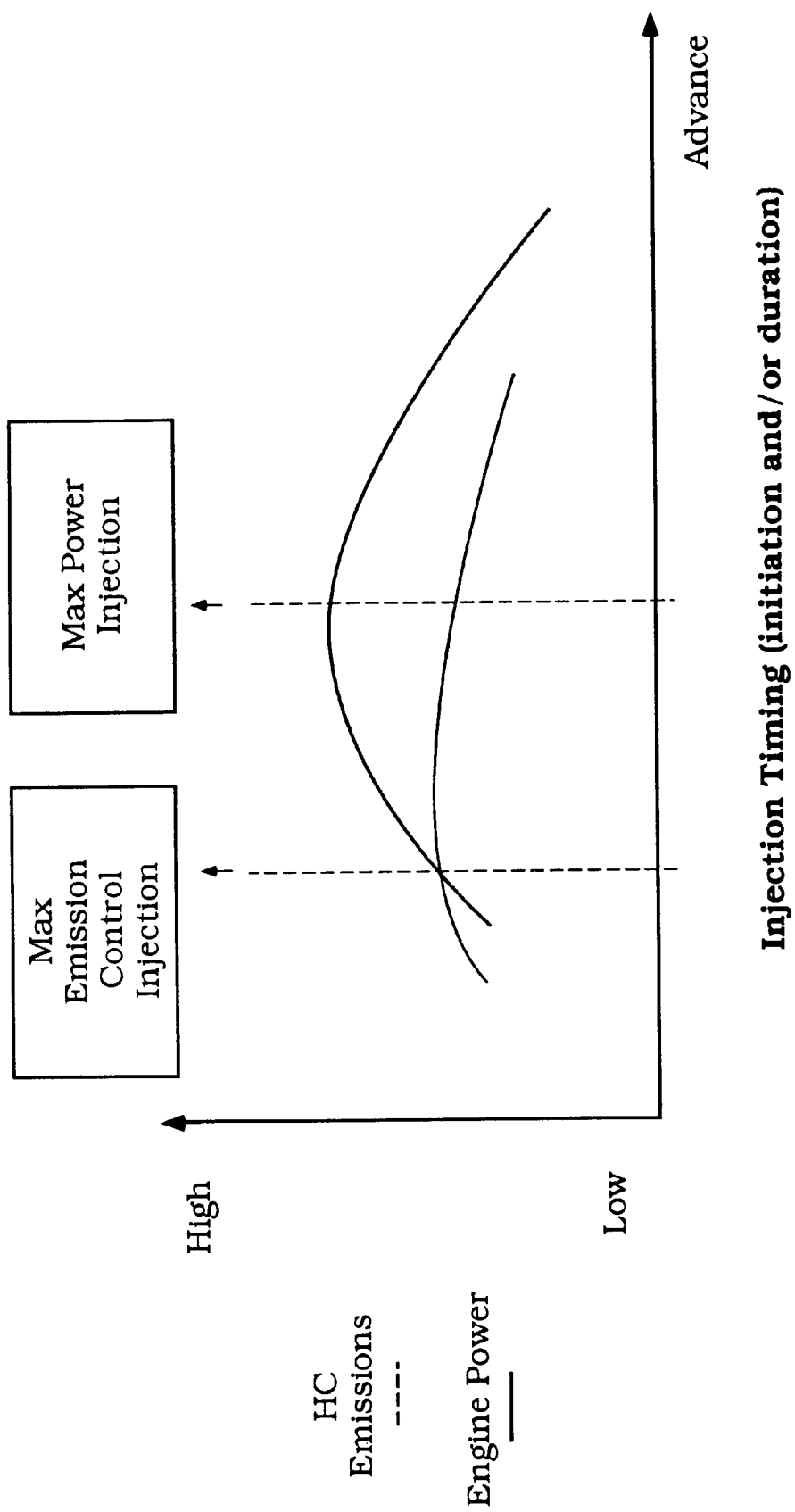
FIG. 8 is a graphical view showing the relationship of hydrocarbon emissions in the exhaust level and engine output in relation to injection initiation timing and/or duration and shows the different control areas where maximum power and maximum exhaust emission control occur to explain the control strategy further.

FIG. 8 is a graphical view showing hydrocarbon emissions and engine power output in broken and solid lines, respectively, in respect to injection initiation timing and/or reduction in injection duration. As may be seen, maximum power is obtained when injection timing and duration is advanced and extended while maximum emission control can be obtained when the injection timing is retarded and also when the duration amount is reduced.

In accordance with the invention, the engine speed is reduced by shifting from the maximum power condition toward the maximum emission control condition, while at the same time reducing engine speed. Engine speed can be reduced under a number of conditions. For example, engine speed is frequently reduced when shifting the transmission comprised of the driven bevel gears 22 and 23 and the dog clutching element 27.

Figure 9:
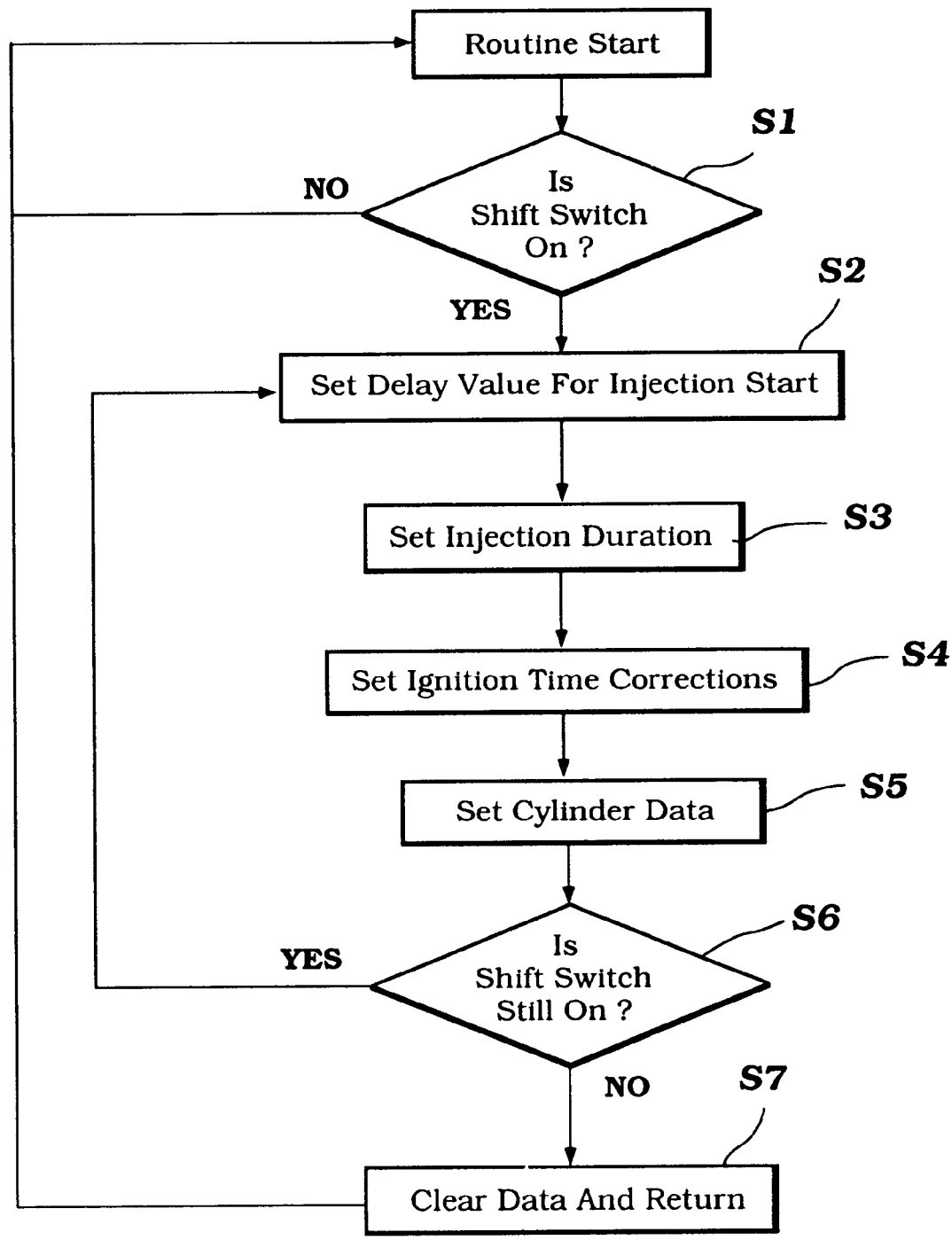
FIG. 9 is a block diagram showing the control routine to obtain engine speed control during effecting of a transmission shift.

That is, a force sensor is provided in the aforenoted and described shift linkage control and if shift pressures are high, engine speed is reduced. FIG. 9 shows the control routine whereby this is accomplished and, as aforenoted, the engine speed is reduced by changing the ignition start timing and/or injection duration under this condition. The amount of retardation and reduction in injection timing depends upon the load factors involved and the amount of speed reduction required.

As seen in this figure, the program starts and moves to the step S1 to determine if a shift switch is turned on. This is done when the shift load is noted to be high. If it is not, the program repeats.

If, however, at the step S1 it is determined the shift switch is on, the program moves to the step S2 so as to set a delay compensation value for the start of engine injection timing. This is shown in FIG. 7 where the delay period during shift operation is indicated. In this case, injection timing begins about at the time when the exhaust port is closed and continues on for a duration dependent upon a map value related to shift load.

The program then moves to the step S3 to determine the injection duration time compensation value based upon a map indicating varying engine conditions.

The program then moves to the step S4 so as to set a compensation in the ignition timing.

The program then moves to the step S5 to effect these adjusted events and determine if the speed reduction should be greater and cause actual cylinder disabling by setting the injection timing to the value zero.

Then at the step S6, it is determined if the shift switch has been turned off. If it is not, the program moves to the step S2 and repeats. If, however, at the step S6 it is determined that the shift switch is now off, the program moves to the step S7 so as to reset the compensation values to normal and the program restarts.

Figure 10:
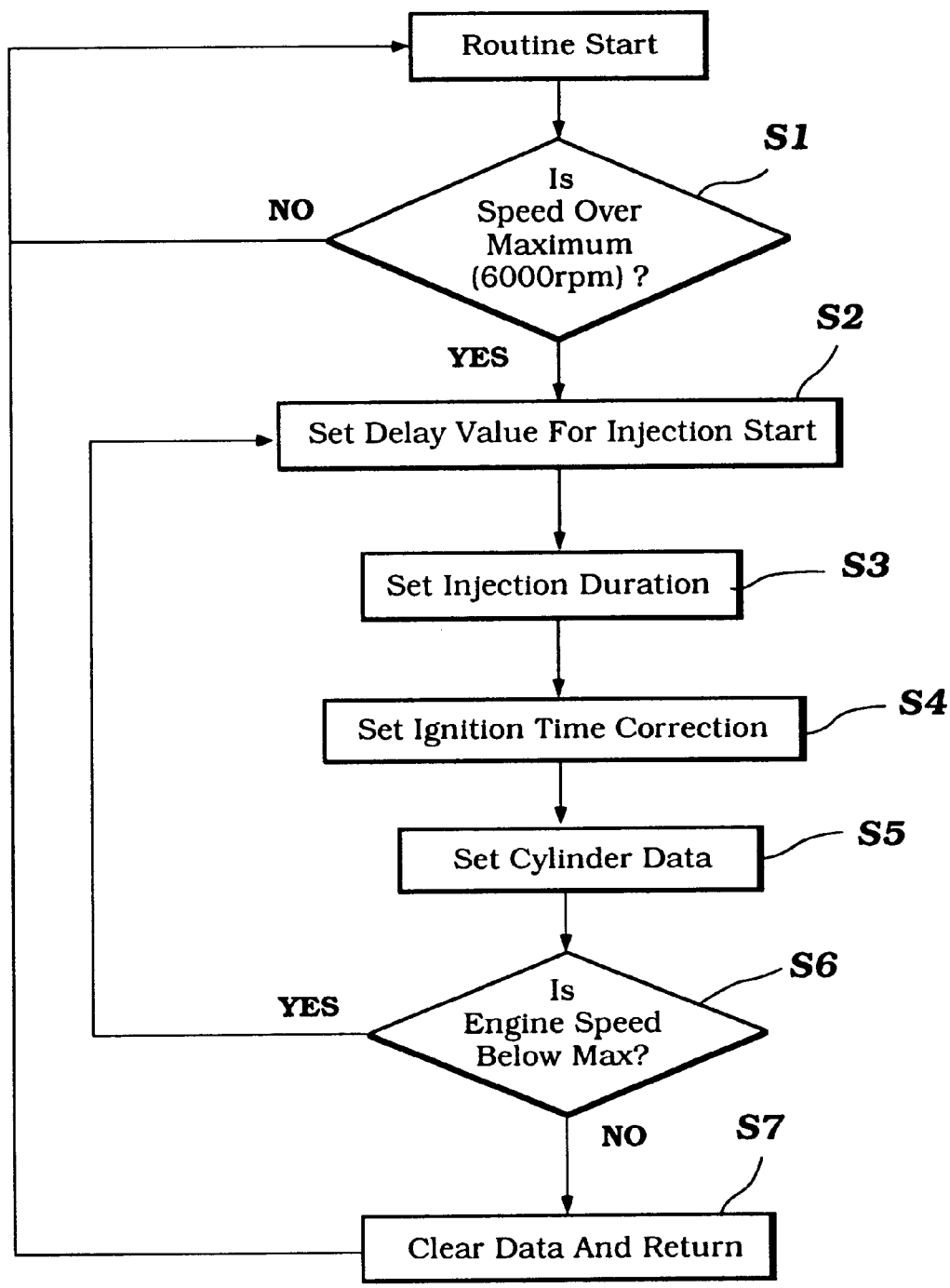
FIG. 10 is a graphical view of the engine control routine so as to limit the maximum engine speed.

FIG. 10 shows another situation wherein engine speed reduction may be accomplished. This particular condition is if the engine speed exceeds a predetermined relatively high engine speed. For example, the speed may be 6000 rpm. Of course, the actual speed will depend upon various engine parameters.

In this program, the control routine again starts and at the step S1, it is determined if the engine speed is above the predetermined high engine speed, i.e., 6000 rpm in the noted example. If it is not, the program repeats.

If, however, it is above this speed, then the program at the step S2 sets a delay compensation value for injection start timing in order to speed it down.

At the step S3, the injection time compensation is also made. These retardation and timing changes can be similar to that shown in FIG. 7.

Then at the step S4, an ignition timing compensation value is set.

At the step S5, it is determined if the engine speed slowing requires actual cylinder skipping in which event the injection duration will be set to zero.

The program then moves to the step S6 to determine if the engine speed has fallen below 6000 rpm. If it has not, the control routine continues back to the step S2 to effect further adjustment which may eventually, in extreme cases, result in cylinder disabling.

If, however, at the step S6, the engine speed has fallen below 6000 rpm, then the program moves to the step S7 so as to reset the original data based on engine parameters and clear the compensation amount. The program then returns to start.

Figure 11:
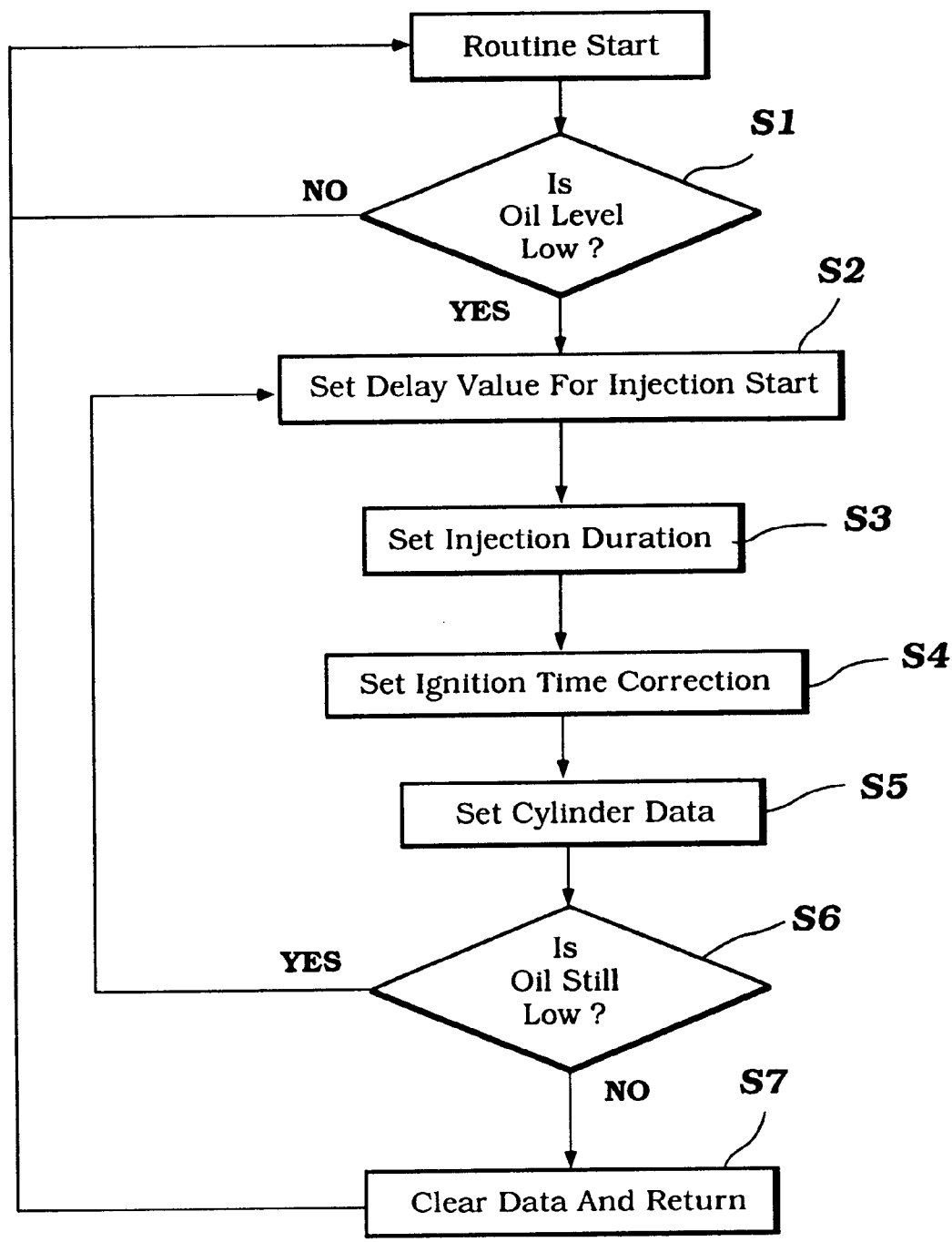
FIG. 11 is a block diagram of a control routine to show the control when lubricant level falls below a pre-determined amount.

FIG. 11 shows another type of control routine that may be employed for engine protection and speed reduction. As has been noted, there is a sensor 95 that senses the oil level in the reservoir 94. If this oil level falls below a predetermined value, it is desirable to reduce the engine speed and warn the operator so that he may return to port and replenish the oil supply.

This program begins at the start and moves to the step S1 so as to check the condition of the oil level switch. If the oil level switch is normal and there is adequate oil, the program returns.

If, however, at the step S1 the engine oil level is low and speed reduction is desirable, the program moves to the step S2 so as to set a delay compensation value for the injection start timing similar to that described in the previous mentioned routine.

The program then moves to the step S3 so as to set an injection time compensation amount. Then, at the step S4, an ignition timing compensation value is set.

At the step S5, it is determined if the injection time duration is zero so that there would be cylinder disabling.

At the step S6, it is again checked to determine if the engine oil level is still low. If it is, then the control routine repeats and may effect further engine speed reduction in the manner described.

If, however, at the step S6, it is determined that the engine oil level has been replenished, then the program moves to the step S7 so as to clear the compensation value and start the routine over.

Figure 12:
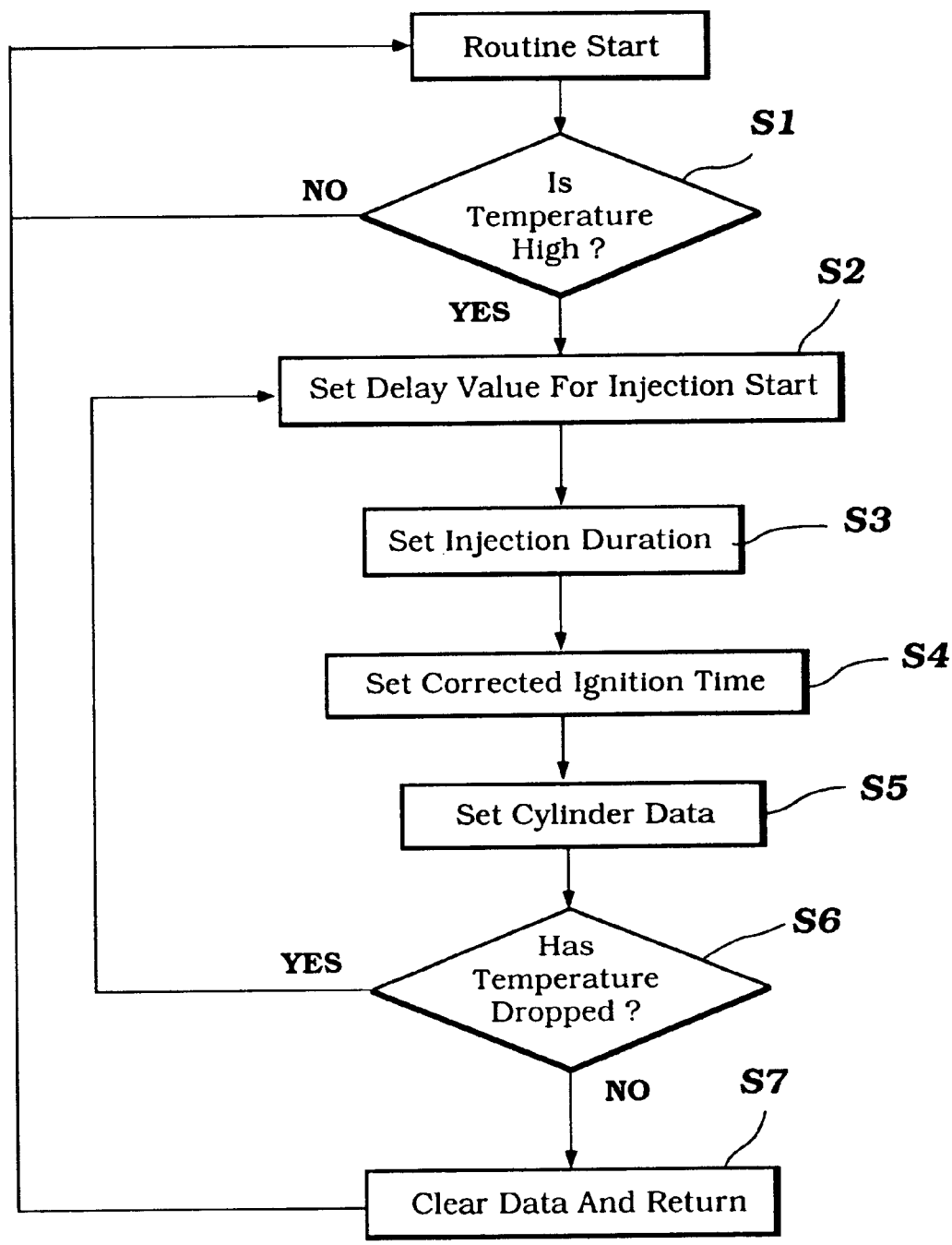
FIG. 12 is a block diagram showing the control routine when there is an engine overheating condition.

A final embodiment for engine protection appears in FIG. 12 and this is protection of the engine when an engine overheat condition is sensed. In this case, the engine speed is again reduced in the hopes that the temperature will fall back to a normal level. Thus, like the previous routines, this program starts and moves to the step S1 to determine if the abnormal condition is existent. That is, the over-temperature condition is measured. If there is no over-temperature condition, the program repeats.

If, however, at the step S1, it is determined that there is an overheat condition, then the program moves to the steps S2, S3, S4 and S5 as with the previous control routine so as to retard the injection start timing, compensate for the injection duration and determine if disabling is involved, as well as compensating for the ignition timing.

If, at the step S6, it is determined that the condition has cured, the program resets and restarts. If not, further controls may be effected through a return to the step S2.

Thus, from the foregoing description, it should be readily apparent that the engine power and speed can be reduced while running is maintained without causing the problems attendant with cylinder skipping, except at extreme conditions. Furthermore, transitional performance is improved. The methods that describe arrangements for controlling the engine speed by retarding injection timing and/or shortening injection duration. It is to be understood that these methods can be done either in conjunction with each other or in sequence with each other to obtain a desired control. Also, ignition timing can be adjusted by delaying it, if necessary. Furthermore, injection timing and spark plug firing can be discontinued under extreme condition.

Unlike prior art methods for reducing engine speed by engine cylinder skipping, which can only be used with multiple cylinder engines, this present control routine can be used with engines having only a single or a few cylinders, as well as multi-cylinder engines. Furthermore, the control routine is not limited to two-cycle engines that can also be employed with four-cycle engines. Various other changes and modifications may be made without departing from the spirit and scope of the invention, as defined by the appended claims.

What is claimed is:

1. A two cycle, crankcase compression, direct cylinder injected internal combustion engine comprised of an engine body defining at least one cylinder bore in which a piston reciprocates, a cylinder head affixed to one end of said engine body for closing said cylinder bore and defining with said piston and said cylinder bore a combustion chamber, a crankcase chamber is formed at the other end of said cylinder bore, at least one scavenge port interconnecting said crankcase chamber with said combustion chamber and opened and closed by the reciprocation of said piston in said cylinder bore for admitting an air charge to said combustion chamber, at least one exhaust port formed in said cylinder bore for discharging burned combustion products from said combustion chamber, said exhaust port being opened and closed by the reciprocation of said piston in said cylinder bore, a fuel injector for spraying fuel directly into said combustion chamber for combustion therein, means for sensing an abnormal condition, and means for reducing engine speed in response to the sensing of said abnormal condition by effecting at least one of retarding injection timing and reducing injection.

2. A two cycle, crankcase compression, direct cylinder injected internal combustion engine as set forth in claim 1, wherein the abnormal condition comprises the shifting of a transmission for driving a load from said engine.

3. A two cycle, crankcase compression, direct cylinder injected internal combustion engine as set forth in claim 1, wherein the abnormal condition comprises an engine temperature condition.

4. A two cycle, crankcase compression, direct cylinder injected internal combustion engine as set forth in claim 1, wherein the abnormal condition comprises an engine speed condition.

5. A two cycle, crankcase compression, direct cylinder injected internal combustion engine as set forth in claim 1, wherein the abnormal condition comprises an engine lubrication condition.

6. A two cycle, crankcase compression, direct cylinder injected internal combustion engine as set forth in claim 1, wherein the injection timing under normal running conditions begins while the exhaust port is open and terminates before the exhaust port closes.

7. A two cycle, crankcase compression, direct cylinder injected internal combustion engine as set forth in claim 6, wherein the abnormal condition comprises the shifting of a transmission for driving a load from said engine.

8. A two cycle, crankcase compression, direct cylinder injected internal combustion engine as set forth in claim 6, wherein the abnormal condition comprises an engine temperature condition.

9. A two cycle, crankcase compression, direct cylinder injected internal combustion engine as set forth in claim 6, wherein the abnormal condition comprises an engine speed condition.

10. A two cycle, crankcase compression, direct cylinder injected internal combustion engine as set forth in claim 6, wherein the abnormal condition comprises an engine lubrication condition.

11. A method of operating a two cycle, crankcase compression, direct cylinder injected internal combustion engine comprised of an engine body defining at least one cylinder bore in which a piston reciprocates, a cylinder head affixed to one end of said engine body for closing said cylinder bore and defining with said piston and said cylinder bore a combustion chamber, a crankcase chamber is formed at the other end of said cylinder bore, at least one scavenge port interconnecting said crankcase chamber with said combustion chamber and opened and closed by the reciprocation of said piston in said cylinder bore for admitting an air charge to said combustion chamber, at least one exhaust port formed in said cylinder bore for discharging burned combustion products from said combustion chamber, said exhaust port being opened and closed by the reciprocation of said piston in said cylinder bore, a fuel injector for spraying fuel directly into said combustion chamber for combustion therein, said method comprising the steps of sensing an abnormal condition, and reducing engine speed in response to the sensing of said abnormal condition by effecting at least one of retarding injection timing and reducing injection.

12. A method of operating a two cycle, crankcase compression, direct cylinder injected internal combustion engine as set forth in claim 11, wherein the abnormal condition comprises the shifting of a transmission for driving a load from said engine.

13. A method of operating a two cycle, crankcase compression, direct cylinder injected internal combustion engine as set forth in claim 11, wherein the abnormal condition comprises an engine temperature condition.

14. A method of operating a two cycle, crankcase compression, direct cylinder injected internal combustion engine as set forth in claim 11, wherein the abnormal condition comprises an engine speed condition.

15. A method of operating a two cycle, crankcase compression, direct cylinder injected internal combustion engine as set forth in claim 11, wherein the abnormal condition comprises an engine lubrication condition.

16. A method of operating a two cycle, crankcase compression, direct cylinder injected internal combustion engine as set forth in claim 11, wherein the injection timing under normal running conditions begins while the exhaust port is open and terminates before the exhaust port closes.

17. A method of operating a two cycle, crankcase compression, direct cylinder injected internal combustion engine as set forth in claim 16, wherein the abnormal condition comprises the shifting of a transmission for driving a load from said engine.

18. A method of operating a two cycle, crankcase compression, direct cylinder injected internal combustion engine as set forth in claim 16, wherein the abnormal condition comprises an engine temperature condition.

19. A method of operating a two cycle, crankcase compression, direct cylinder injected internal combustion engine as set forth in claim 16, wherein the abnormal condition comprises an engine speed condition.

20. A method of operating a two cycle, crankcase compression, direct cylinder injected internal combustion engine as set forth in claim 16, wherein the abnormal condition comprises an engine lubrication condition.

* * * * *